(12) United States Patent
Ohlinger et al.

(10) Patent No.: US 7,822,294 B2
(45) Date of Patent: Oct. 26, 2010

(54) METHOD AND APPARATUS FOR PRODUCING THREE-DIMENSIONALLY STRUCTURED SURFACES

(75) Inventors: Rainer Ohlinger, Sinzheim (DE);
Günter Vogt, Rinteln (DE); Roland Wolff, Seelze (DE)

(73) Assignee: Benecke-Kaliko AG, Hannover (DE)

( * ) Notice: Subject to any disclaimer, the term of this patent is extended or adjusted under 35 U.S.C. 154(b) by 186 days.

(21) Appl. No.: 11/942,335

(22) Filed: Nov. 19, 2007

(65) Prior Publication Data
US 2008/0136065 A1 Jun. 12, 2008

Related U.S. Application Data

(63) Continuation of application No. PCT/EP2006/002826, filed on Mar. 29, 2006.

(30) Foreign Application Priority Data
May 18, 2005 (DE) .................... 10 2005 022 696

(51) Int. Cl.
*G06K 9/54* (2006.01)
*G06K 9/60* (2006.01)
*G09G 5/00* (2006.01)
*G06F 19/00* (2006.01)

(52) U.S. Cl. ............... 382/302; 382/154; 345/679; 700/98; 700/118; 700/163

(58) Field of Classification Search ........... 345/419, 345/423, 441; 382/154, 260; 700/98, 118, 700/163
See application file for complete search history.

(56) References Cited

U.S. PATENT DOCUMENTS

| | | | |
|---|---|---|---|
| 4,551,297 A | 11/1985 | Bötcher et al. | |
| 4,980,762 A | 12/1990 | Heeger et al. | |
| 5,338,915 A | 8/1994 | Hildebrand et al. | |
| 5,625,717 A * | 4/1997 | Hashimoto et al. | 382/260 |
| 5,759,473 A | 6/1998 | Minke et al. | |
| 5,886,317 A | 3/1999 | Hinrichs et al. | |
| 6,084,980 A * | 7/2000 | Nguyen et al. | 382/154 |
| 6,249,600 B1 * | 6/2001 | Reed et al. | 382/154 |
| 6,323,863 B1 * | 11/2001 | Shinagawa et al. | 345/441 |

(Continued)

FOREIGN PATENT DOCUMENTS

| | | |
|---|---|---|
| DE | 3405985 A1 | 3/1985 |
| DE | 3439822 A1 | 6/1985 |
| DE | 4324970 A1 | 1/1995 |
| DE | 4326874 A1 | 2/1995 |
| DE | 4441216 A1 | 5/1996 |

(Continued)

*Primary Examiner*—Crystal J Barnes-Bullock
(74) *Attorney, Agent, or Firm*—Laurence A. Greenberg; Werner H. Stemer; Ralph E. Locher

(57) ABSTRACT

In a method for producing three-dimensionally structured surfaces of objects as a reproduction of an original surface, the topology of the original surface is determined, and the data are used for controlling a machining tool. The determined topology and a random topology of a reproduction surface are brought closer to one another via a series of proximity comparisons until all items of height information of the reproduction surface are successively replaced by items of height information from the original surface, and that once an established similarity between the topologies of the reproduction surface and the original surface is obtained, the items of height information of the reproduction surface are provided for controlling the machine tool serving to machine the surface of the object.

15 Claims, 1 Drawing Sheet

U.S. PATENT DOCUMENTS

| | | |
|---|---|---|
| 6,337,749 B1 | 1/2002 | Härtel et al. |
| 6,962,640 B2 | 11/2005 | Mäker et al. |
| 7,023,433 B2 * | 4/2006 | Tsai et al. ............ 345/419 |
| 2005/0134586 A1 * | 6/2005 | Koo et al. ............ 345/423 |
| 2005/0146521 A1 * | 7/2005 | Kaye et al. ............ 345/419 |
| 2007/0120842 A1 | 5/2007 | Hess |
| 2009/0157215 A1 * | 6/2009 | Stahlhut et al. ............ 700/118 |

FOREIGN PATENT DOCUMENTS

| | | |
|---|---|---|
| DE | 196 18 367 A1 | 11/1997 |
| DE | 198 55 962 C1 | 5/2000 |
| EP | 0154141 B1 | 1/1988 |
| EP | 1238789 B1 | 1/2004 |
| WO | 2005/030431 A1 | 4/2005 |

* cited by examiner

METHOD AND APPARATUS FOR PRODUCING THREE-DIMENSIONALLY STRUCTURED SURFACES

CROSS-REFERENCE TO RELATED APPLICATIONS

This is a continuation, under 35 U.S.C. §120, of copending international application PCT/EP2006/002826, filed Mar. 29, 2006, which designated the United States; this application also claims the priority, under 35 U.S.C. §119, of German patent application DE 10 2005 022 696.5, filed May 18, 2005; the prior applications are herewith incorporated by reference in their entirety.

BACKGROUND OF THE INVENTION

Field of the Invention

The invention relates to a method for producing three-dimensionally structured surfaces of objects. The substantially unbounded object surface is produced with the aid of a machine tool as a reproduction of a three-dimensionally structured original surface that is finite and bounded by borders (specimen), and in which the topology of the original surface is first determined with the aid of a scanning method and the topological data determined in this way and substantially containing the heights belonging to each area element of the original surface are used for the electronic control of a machine tool, preferably a laser, for machining the three-dimensionally structured object surface.

Methods for the laser engraving of surfaces of natural or synthetic specimens are already known. However, they all have deficiencies in the quality of the surface structure that is reproduced.

Published, non-prosecuted German patent application DE 43 24 970 A1 discloses a method for producing three-dimensionally structured surfaces of an embossing roller for the continuous embossing of the surface of a thermoplastic film, the surface of the embossing roller representing the negative form of the surface to be embossed. This technique is used for the production of thermoplastic films as a substitute for natural surfaces that are highly complex in their structure, such as for example fine-pored, highly grained cowhide, buffalo hide, etc. This involves first machining the surface of a positive form with the aid of laser engraving, the laser (beam) thereby being controlled by electrically/electronically stored data, which have previously been obtained with the aid of an optical or mechanical scanning of the original surface. Such a material-removing laser engraving method can be used on the one hand for producing an embossing roller directly and without the requirement for further intermediate steps. On the other hand, such a method also allows indirect production. For this purpose, the laser beam is directed onto the circumferential surface of a roller/auxiliary roller, on the surface of which a positive structure/positive texture of the original surface is incorporated. The laser beam is in this case moved as a tool in relation to the roller surface. After that, an impression of the roller surface is taken in silicone rubber, which has the form of a tube and is vulcanized to form what is known as the embossing daughter. This embossing daughter is then pulled off from the auxiliary roller, in that the interior of the (silicone) tube is turned out. The inner, and now out-turned outer surface of the embossing daughter now has again a negative form of the original surface. The thus turned-back embossing daughter is then pulled onto a pressing roller/embossing roller. The embossing roller is then put together with a supporting counter roller to form a rolling stand. With such a rolling stand, a thermoplastic film can then be embossed continuously and in "endless webs", the surface of which has the same positive form as the original surface.

Here, of course, only a bounded area, for example a piece of buffalo hide of an indeterminate size, is scanned by an optical or mechanical scanning of the surface of the specimen (original surface). In the material-removing laser machining to produce the embossing roller, the surface information obtained in this way is joined together in a multiply recurrent manner, as a result of which transitions or boundary regions disadvantageously become visible during the continuous embossing. An exact teaching about the modulation of the laser beam with regard to the exact three-dimensional surface reproduction is also not described, neither with regard to the scanning nor with respect to the machining of the embossing rollers.

Published, non-prosecuted German patent application DE 43 26 874 A1, corresponding to U.S. Pat. No. 5,886,317, discloses a method for embossing a pattern into the surface of a workpiece, in which surface information in the form of electrical control signals is likewise produced with the aid of an optical or mechanical scanning of a surface of a specimen and stored and is then used for controlling the engraving laser. In that method, in the region of transitions or joints, the surface information obtained there from the specimen is engraved as the same pattern onto the workpiece multiple times one after the other. Engraving the same surface information multiply and/or alternately in the reverse sequence of the information—that is forward and backward—in other words also with a certain randomness, is also disclosed. Although such methods make the transitions become somewhat smoother, they continue as before to remain visible.

It goes without saying that the methods mentioned for producing embossing rollers for continuously embossing the surface of a thermoplastic film or engraving a pattern into the surface of a workpiece can be used for producing what are known as intermediate originals with a positive structure or texture corresponding to the original surface, from which negative impressions are again created, and these can finally be used for embossing a positive texture/structure on the surfaces of the end product.

However, it is similarly possible, as for example published, non-prosecuted German patent application DE 44 41 216 A1 describes, to use such a material-removing laser engraving method to produce an embossing roller directly and without the requirement for further intermediate steps. In this case, a laser beam is directed onto the circumferential surface of an embossing roller formed of silicone rubber and is moved in relation to the circumferential surface in such a way that a surface structure of a specimen is burned as a negative form directly into the outer surface of the embossing roller. In the case of this method, too, the transitions as produced by the joining together of the original surface are visually perceptible and have a detracting effect on quality.

Published, non-prosecuted German patent application DE 34 05 985 A1 describes an apparatus and a method for continuously embossing a thermoplastic film, in particular also the production of an associated embossing roller, in which the topology of the original surface is captured with the aid of an impressing method. This involves first taking an impression of the original surface in silicone rubber. The impression, known as the embossing mother, is vulcanized and pulled off from the original surface. On account of the final dimensions of the original, this first impression, the embossing mother, is also bounded in its dimensions and typically elongate or strip-shaped.

With the embossing mother, the surface of which then represents a negative form of the original surface, the surface of a thermoplastic film that is substantially comparable in its dimensions is embossed, and fixed under the application of pressure and heat. The surface of the thermoplastic film then again has the positive form of the original surface.

A number of pieces of the thermoplastic film, that is to say a number of "imprints", are then joined together. The joining edge regions produced must then be over-embossed with the embossing mother under pressure and heat, in order to adapt the transition in the region of the seam to the structure and the appearance of the remaining area. In this way, an elongate-rectangular thermoplastic film is created from a relatively large number of individual pieces. This film is then made into a tube/cylinder, with its longitudinal sides butting together. The seam formed by the longitudinal sides is then likewise over-embossed with the embossing mother under pressure and heat, in order to make the joining produced as invisible as possible.

Another method is to wind strip-shaped thermoplastic film, for example on an auxiliary roller, helically into a tube in such a way that the side regions butt together to form butt seams. The helical seams/seam regions are then over-embossed with the embossing mother under pressure and heat, in order to adapt the transitions.

Therefore, in both cases a tube or a cylinder of thermoplastic film is obtained, with an outer surface that has the positive form of the original surface with an outstanding informational content. This tube is then applied to an auxiliary roller.

Silicone rubber is then once again applied to the auxiliary roller provided with the tube of thermoplastic film and an impression of the outer surface is again taken, the impression having the form of a tube. This is again what is known as the embossing daughter, which is likewise vulcanized and then pulled off from the auxiliary roller provided with the thermoplastic film, by turning back, as already described above.

The inner and then turned-out surface of the embossing daughter then has again a negative form of the original surface and, in the way already described, is pulled onto a pressing roller/embossing roller, with which the film webs are then embossed.

The transferred "informational content" in the case of such impressing methods is high, i.e. noticeably higher than in the case of customary laser engraving methods, and produces a high-quality reproduction surface that is extremely similar to the original surface. However, in spite of all efforts, the roller surfaces and the surfaces of the embossed film webs are not free from visible transitional regions produced by putting pieces together to form an embossing roller surface. These transitional regions cannot be entirely eliminated by the previously known remedial measures, such as for example the subsequent over-embossing.

Published, non-prosecuted German patent application DE 34 39 822 A1, a divisional application from published, non-prosecuted German patent application DE 34 05 985 A1, describes a method that is similar in principle for producing a plastic film with a grain, in particular a natural-looking leather grain, in which the plastic film ultimately obtained and the embossing daughter, i.e. the last and last-but-one step of the method already described, are obtained/performed by pouring or brushing on, subsequent vulcanizing and pulling off.

European patent EP 0 154 141 B1, which belongs to the same set of property rights, basically discloses the method already represented by the two aforementioned documents and is confined merely to the production of the embossing roller.

In the case of the methods represented in the three aforementioned publications, along with the visible transitional regions there is the disadvantage that the repeated alternating actions of taking impressions/re-forming in positive and negative forms requires considerable effort and extremely careful, and consequently time-intensive, work, and the frequent changing of release agents, if it is wished to reproduce all the fine depressions and pores of the original surface, i.e. the grain of the specimen.

Elimination of the disadvantages with respect to the use of release agents is the aim in a method that is disclosed by European patent EP 1 238 789 B1, corresponding to U.S. Pat. No. 6,962,640. This is a method for producing an embossing roller from silicone rubber, the embossing surface of which has a negative surface texture/structure in comparison with the surface of the original/specimen. This involves first machining the surface of an auxiliary roller with the aid of a laser machining method. The surface in this case is formed of nitrile-butadiene. The material-removing laser beam is directed at the circumferential surface of the auxiliary roller. The laser beam moves in relation to the latter and is controlled by the items of surface information of an original surface/specimen in the form of data in such a way that a positive structure/positive texture corresponding to the specimen is produced in the surface of the auxiliary roller. After that, an impression of the roller surface is taken in silicone rubber, which has the form of a tube, and is vulcanized to form what is known as the embossing daughter. The two materials, nitrile-butadiene rubber and silicone rubber, can be separated relatively easily and without the use of release agents. The procedure already described above is then followed. The embossing daughter is pulled off, in that the interior of the (silicone) tube, provided with the negative structure/negative texture, is turned out and finally pulled onto a pressing roller/embossing roller.

All the previously known methods have the disadvantage that the quality of the three-dimensional reproduction of the original surface is inadequate in its fidelity.

This is in particular on the one hand because the joining edges or transitional regions, as produced by putting bounded sub-regions together to generate an embossing roller surface, cannot be made invisible with adequate quality, and on the other hand because the putting together of such sub-regions produces a chequerboard-like pattering in the surface, produced as a result of varying light reflection or light refraction. This is not accepted for example by those supplied with high-quality coated products, i.e. the manufacturers of articles made of imitation leather, dashboards, purses, bags or furniture.

The laser engraving methods of a conventional type that are available as an alternative have so far not been suitable however for transferring an adequately high informational content of a surface of a complex specimen to a reproduced surface in such a way that a reproduction surface identical to the original appears.

In addition, in spite of all efforts such as computational pattern reversal, manual smoothing of the border regions etc., visible transitional regions occur here too.

SUMMARY OF THE INVENTION

It is accordingly an object of the invention to provide a method for producing three-dimensionally structured surfaces that overcomes the above-mentioned disadvantages of the prior art methods and devices of this general type, which leads to an extremely faithful reproduction of a specimen surface and which allows a reproduction or duplication of any natural or created pattern or any original surface, even small patterns, that is free from transitions and borders and can be enlarged at will, without formation of repeats or moulette streaks.

With the foregoing and other objects in view there is provided, in accordance with the invention, a method for producing three-dimensionally structured surfaces of objects. An object surface is produced with an aid of a machine tool as a reproduction of a three-dimensionally structured original surface being finite and bounded by borders. A topology of the original surface is first determined with an aid of a scanning method and the topological data determined in this way and substantially containing heights belonging to each area element of the original surface are used for electronic control of the machine tool for machining a three-dimensionally structured object surface. The method includes the steps of:

a) storing a first data record with a topology of a bounded original surface, the first data record containing measured items of height information of respectively associated area elements of the bounded original surface;

b) subsequently storing a second data record, corresponding to a randomly generated topology of an unbounded reproduction surface, the second data record containing randomly generated items of height information for respectively associated area elements of the unbounded reproduction surface;

c) around a first random item of height information of the unbounded reproduction surface, grouping together a number of neighboring random items of height information to form a first subset and storing the first subset in a third data record, a position and configuration of the neighboring random items of height information likewise being stored by coordinates of the respectively associated area elements of the unbounded reproduction surface;

d) repeatedly comparing the third data record with a fourth data record, the fourth data record being occupied by new data with every new comparison by the further steps of:

i) storing a second subset of neighboring measured items of height information of the bounded original surface and also a position and configuration of the neighboring items of height information of the bounded original surface given by coordinates of the respectively associated area elements, in the fourth data record;

ii) the position and configuration of the neighbouring items of height information of the first and second subsets being similar or identical;

e) on reaching a defined similarity between an item of height information of the first subset and the items of height information of the second subset, the first random item of height information of the bounded reproduction surface is substituted by a second item of height information of the bounded original surface, which corresponds in its position and configuration with respect to the second subset to the position and configuration of the first item of height information with respect to the first subset;

f) carrying out and repeating the method steps c) to e) with different first and second subsets and successively for all the items of height information of the unbounded reproduction surface as often as it takes until all items of height information of the unbounded reproduction surface have been successively substituted by items of height information from the bounded original surface, the items of height information that have already been substituted in the unbounded reproduction surface with an aid of at least one preceding method steps e) being included in the first subset for carrying out method step c) for the comparison of the subsets in method step d);

g) after all the items of height information of the unbounded reproduction surface have been substituted by items of height information of the bounded original surface in method step f), method steps a) to f) are run through at least one more further time, the area elements respectively associated with the items of height information being reduced with every further run, and a reaching of a defined similarity between a new first subset and the neighboring items of height information already stored in a previous run of method steps a) to f) being checked in method step e) as a simultaneous further criterion; and h) after reaching a defined similarity between the unbounded reproduction surface and the bounded original surface, the items of height information of the unbounded reproduction surface are made available for controlling the machine tool for machining the three-dimensionally structured object surface.

In the case of the method according to the invention, first a first data record with the topology of a bounded original surface is stored, the data record contains the measured items of height information of the respectively associated area elements of the original surface.

The term "height information" is a measure in the vertical direction, that is to say substantially perpendicular or "normal" to the area, and is to be understood here—depending on the reference point—as synonymous with height coordinate, depth information or depth coordinate.

After that, another, "second" data record is created and stored, containing items of height information and associated area elements in a way similar to the first data record. However, the data record is not based on measured variables, but contains randomly generated data. These data therefore constitute items of height and area information produced from randomly determined data. This creates a randomly generated topology, which corresponds as it were to a "synthetic" area. The "second" data record therefore contains randomly generated items of height information for respectively associated "area elements".

The "synthetic" area, characterized with the aid of randomly generated data, is referred to here as the "unbounded reproduction surface". The term "unbounded" distinguishes the reproduction area created from the actual original specimen or area, which is of course bounded in some form or other, i.e. is finite or provided with borders. Here you can imagine for instance an original specimen in the form of a piece of buffalo hide the size of a towel, from which the material for covering the surface of the sofa is to be produced.

The term "reproduction surface" in this case does not initially refer to the finished surface, identical to the original, of the object to be machined, that is to say does not refer to the surface of the object that is finally created with the aid of the machine tools, but to an "intermediate product", which still has to be machined and transformed into a finished end product.

Therefore, here the reproduction surface is initially a kind of intermediate original of an area, which first has to be further processed in a number of processing steps to form the finished reproduction area. This is because it is only after the processing steps in terms of the method described below that the "finished" reproduction surface is obtained, representing the object surface that is identical to the original after the final processing step, and providing the data required for the corresponding control of a machine tool.

In order to achieve this aim, method step (c) then consists in that, around a first—as described above randomly generated—item of height information of the reproduction surface, i.e. around an arbitrarily selected first "point" of the reproduction surface, a number of neighboring random items of height information are grouped together to form a first subset and are stored in a third data record, the position and arrangement of the neighboring items of height information likewise being stored by the coordinates of the respectively associated area elements of the reproduction surface. The third data record consequently contains data of the reproduction surface.

After that, the third data record is repeatedly compared with a fourth data record, which is occupied by new data with every new comparison, a second subset of neighboring measured items of height information of the original surface and also the position and arrangement of the neighboring items of height information of the original surface given by the coordinates of the respectively associated area elements being stored in the fourth data record. The fourth data record consequently contains data of the original surface.

There then takes place a comparison of the surroundings, the neighborhoods as such, on the "synthetic" area and the original surface, the structure of the neighborhoods being as similar as possible or identical. The "neighborhoods", it should be noted, contain respectively neighboring items of height information around the point under observation—likewise an item of height information—stored as a data record in the first and second subsets.

On reaching a defined similarity between the item of height information of the first subset and the items of height information of the second subset, the first random item of height information of the reproduction surface, i.e. the height value for the first observed "point" of the reproduction surface, is then substituted by a second item of height information of the original surface, which corresponds in its position and arrangement with respect to the second subset to the position and arrangement of the first item of height information with respect to the first subset.

As a result, in another method step (e), a height value for a first "point" of the reproduction surface is therefore substituted by a height value of another, second "point" on the original surface. The criterion for the selection of the "substitute value" is in this case "matching" neighborhoods from the reproduction area and the original area, to be specific matching with regard to their items of height information and with respect to their position in relation to the first and second points in the reproduction surface and the original surface. The "surroundings subset" (data record 3) from the reproduction area is therefore compared with the "surroundings subset" from the original surface (data record 4). Whenever items of height information from a previous processing step are already available, these are included in the criterion for the selection of the "substitute value", as described below.

Method steps c) to e) are then carried out and repeated with different first and second subsets as often as it takes until all points, i.e. all items of height information, of the reproduction surface have been successively processed and substituted by items of height information from the original surface (method step "f"). With each repetition, the reproduction area then becomes more similar to the original surface, in particular whenever the items of height information that have already been substituted in the reproduction surface with the aid of one or more preceding method steps are included in the first subset for carrying out method step c) for the comparison of the subsets in method step d).

Here it is important to keep in mind that the reproduction area is generally much larger than the original surface, so that the "fewer" number of points or items of height information of the original surface are distributed by the method according to the invention a number of times, i.e. for instance in a naturally increasing progression, on the reproduction surface.

The further paradox that initially arises when it is considered that all the points of a reproduction area are to be substituted but the area concerned is, by definition, an "unbounded" area no longer applies if, for example, the last point at the right-hand border (end) of the area is considered to be the neighborhood of the first point at the left-hand border (beginning) of the area. The area concerned is then a self-contained, and consequently likewise unbounded, area.

After all the items of height information of the reproduction surface have been substituted by items of height information of the original surface in method step f), method steps a) to f) are run through one or more further times, the area elements respectively associated with the items of height information being reduced with every further run, in particular halved, and the reaching of a defined similarity between the new first subset and the neighboring items of height information already stored in the previous run of method steps a) to f) being checked as a simultaneous further criterion in method step e).

The additional comparison with the neighboring items of height information "found" and stored in the respectively preceding run can of course only be carried out if there was already a preceding run.

As a result, the observation becomes more and more fine and the two areas become more and more similar. This is carried out repeatedly until the entire reproduction surface has a defined similarity to the original surface. This method step, known per se as a "resolution pyramid" (reducing/doubling of the area elements, comparison with the result previously achieved), is only limited by the time available, or the capacity of the data processing available.

"Defined" similarity is not to be understood here as meaning a fixed value or a limit value/threshold value as such, but a criterion for selection and determination that is implemented with the aid of statistical methods and laws of distribution that are known and not explained here in any more detail.

Only after that are the items of height information of the reproduction surface made available for the control of the machine tool for machining the surface of the article. Generally, and if suitable materials are used, the reproduction surface then considered to be "finished" is indistinguishable from the original surface.

This is because the method according to the invention does not create an identical copy of the original area as the reproduction area/object area, as would be obtained for example by a photo, but a surface that can be enlarged at will in its characteristics, in its appearance and in its "naturally" and randomly grown structures, which is entirely without moulette streaks and repeats, as a "continuation" of the original surface. The impartial observer believes he is seeing the original surface and cannot distinguish between the original surface and the object surface. To this extent, the term "surface identical to the original" is to be understood hereafter and in the present context not as an identical copy but, as described, as a "continuation" of the original surface.

When carrying out the method, automatic digital scanning methods are advisedly/advantageously used to determine the topology of the original surface. Their measured values can be easily processed in computer-aided equipment/computers. Altogether, the method is of course dependent on high-speed electronic data processing, to arrive at results in a reasonable amount of time. In practice, however, it can also be carried out with the aid of, for example, a roughness measuring instrument (Perthometer) for determining the height information, with the aid of manually and optically determined data records, and with the aid of a suitable formable or storable surface structure of a reproduction surface model.

A further advantageous form of the method relates in that the unbounded reproduction surface is formed as a toroidal area, i.e. as a torus or cylinder with completely defined connection functions, in particular as a surface of an annular torus of a substantially circular cross section. In this way, the form of a cylindrical roller, and consequently an object surface that is ideally suited as the surface of a machine tool, to be precise for example as a surface of an embossing roller for embossing film webs, is obtained in a simple way and merely by defining a line of intersection and "opening up" the annular torus.

A further advantageous form of the method relates in that the position and arrangement of the neighboring items of height information of the reproduction surface and of the original surface, determined by the coordinates of the respectively associated area elements, are formed as an L-shaped arrangement of the neighboring items of height information. As a result, the neighborhood comparison is improved in a simple way and with a minimum of data, by items of information from two directions being included in the processing. It goes without saying that any other arrangement of neighborhood zones can be chosen, for example a circular arrangement of the neighboring items of height information, which would be particularly suitable for instance for subsequently re-working small isolated defective structures of a reproduction area.

A further advantageous form of the method relates in that the scanning of the topology of the original surface is performed with the aid of optical methods in which optical data are converted into electrical quantities. With optical methods, measurements of any desired accuracy can be carried out, dependent on the wavelengths of the light that is used.

A further advantageous form of the method relates in that the scanning is performed with the aid of a light measuring method, preferably by three-dimensional scanning with the aid of an interferometer. Such a scanning method has an accuracy in the lateral and vertical directions that is adequate, for example for measuring a leather hide with its fine hair pores adequately accurately. Advantageously, for this purpose the height measurement is performed with a vertical resolution of from 2 to 100 nm and the lateral scanning is performed with a resolution of from 1 to 100 µm, preferably with a lateral resolution of from 5 to 40 µm.

A further advantageous form of the method relates in that the three-dimensionally structured object surface is formed inversely in relation to the original surface. By such an inversion of the items of height information/data determined from the method according to the invention it is possible to produce a tool, for example a roller, which has the negative form of a surface identical to the original and can consequently be used directly for the embossing of film materials.

A further advantageous form of the method relates in that the items of height information assigned to the respectively associated area elements are transformed into items of color information for the individual area elements and stored, in particular in the form of gray-scale values for the individual area elements, and in which, after carrying out method steps of a) to f), the items of color information or the gray-scale values of the reproduction surface are transformed into corresponding items of height information and are made available for the control of the machine tool for machining the reproduction. This results in simplifications in the storage of the items of height information, which can then for example be performed two-dimensionally.

A further advantageous form of the method relates in that the coordinates of the items of height information of the reproduction surface used for the control of the machine tool and the position and arrangement of the respectively associated area elements are compressed or extended in the area regions in which an extension or compression of the object surface or machining surface/film surface is performed in a later machining or re-forming operation. The fact that the data for controlling the machine tool are in a digital form and are nevertheless identical to the original surface allows the data to be provided relatively easily with an "offset", that is to say a regular and identical additional value, which compensates for subsequent deformations and has a surface identical to the original even in the deformed region.

A particularly suitable use of the method according to the invention is that of producing decorative surfaces free from joining edges on films, in particular on thermoplastic and/or elastomeric polymer films or polymer-coated sheet-like formations, on which the decorative surface is embossed with the aid of the object surface.

Here, the reproduction surface is formed as a closed, in particular toroidal, roller surface, the three-dimensionally structured object surface first being introduced with the aid of a laser as a machine tool into an auxiliary roller provided with an outer layer of polymer material, which is consequently given the positive form of the original surface.

After that, a layer of silicone rubber is applied to the auxiliary roller and vulcanized, whereby a tube of silicone rubber is produced. The tube of silicone rubber is then pulled off from the auxiliary roller, in that the interior of the (silicone) tube is turned out.

Subsequently, the thus turned-back silicone tube, provided with the negative form of the original surface on the outside, is pulled onto a pressing roller/embossing roller as an embossing tube, after which the surface of the film is embossed with the pressing roller/embossing roller produced in this way.

An embossing roller/embossing tool with which a large amount of film web provided with a surface identical to the original can be produced in a continuous embossing process is obtained in this way.

A further particularly suitable use of the method according to the invention is that of producing embossing rollers for thermoplastic films. Here, the production surface is formed as a roller surface, the three-dimensionally structured object surface being formed inversely in relation to the original surface and being introduced with the aid of a laser as a machine tool directly into an outer layer of a cylindrical body, which is consequently given the negative form of the original surface on its outside, after which the surface of the film is embossed with the outer surface of the cylindrical body. This dispenses with further subsequent processes of taking impressions or making prints.

A further advantageous form of the method relates in that the inverse surface is introduced directly into an outer layer of an embossing roller as a cylindrical body. In this way, the production of an embossing surface of an embossing roller is possible in just one working step.

A further advantageous form of the method relates in that the cylindrical body is formed as a hollow cylinder, which is pulled onto a corresponding pressing roller/embossing roller. This allows the production of lightweight hollow rollers (sleeves), which can be easily transported and stored and pulled onto the actual roller body.

A particularly suitable apparatus for carrying out the method is likewise disclosed, the apparatus having a $CO_2$ gas laser as the machine tool and a control device for controlling the intensity of a laser beam configured for machining a roller surface. The control device has a first control unit for regulating and keeping constant the intensity/energy of the laser beam, and in that the control device has a downstream second control unit for modulating the intensity of the regulated laser beam in dependence on the items of height information of the reproduction surface. Only by the formation of such a dual control unit is it possible to control a laser with the items of height information prepared according to the method for the machining of the object surface. This is because the accuracy of the items of height information demands extremely accurate control of the laser intensity. This is surprisingly only achieved when the laser beam is first kept entirely constant in its power, that is when all influences, no matter how small, caused by the operating time, temperature, resonator changes etc., are compensated by a first control unit. Only then can the intensity of the laser be controlled in accordance with the items of height information by a second control unit with a usable result. With its wavelength of approximately 10 μm, the $CO_2$ gas laser used here is particularly suitable for the machining of polymer materials.

Lasers of other types can of course also be used for the machining of the surface by the method according to the invention, for example solid-state lasers such as the Nd:Yag laser. These solid-state lasers are nowhere near as critical with respect to thermal stability as the gas lasers. Regulating the laser intensity on the basis of the items of height information would consequently be fundamentally easier, and also achievable with only one control device, in the case of such solid-state lasers. However, the wavelengths of such solid-state lasers (about 1 μm in the case of Nd:Yag lasers) are not always appropriate for the characteristics of the material to be machined, here a polymer material, so that the latter has to be adapted, for example by additions of carbon black, to increase the absorbing capacity for these wavelengths. In principle, the selection of the laser depends on the achievable engraving quality, which is determined on the one hand by the quality of the laser beam and on the other hand by the burn-off behavior of the material to be machined.

A further advantageous form of the apparatus relates in that the first control unit is constructed in such a way that part of the laser beam is reflected out and the input power of the laser is controlled in dependence on the intensity/energy of the reflected-out part of the laser beam. Directly acting feedback for keeping the laser beam constant is achieved as a result.

A further advantageous form of the apparatus relates in that the downstream second control unit for regulating the laser intensity reflects out part of the regulated laser beam, the second control unit for modulating the intensity of the regulated laser beam being formed as a grating that changes its transmissivity in dependence on oscillations. Such an acoustic-optical modulator, known per se, is in this case ideally suited on account of its sensitive controller and transmission behavior in conjunction with the laser beam kept exactly constant in its intensity for modulating the items of height information prepared by the method according to the invention for the machining of the object surface in the form of influencing the laser intensity.

The reflecting out takes place into what is known as a laser dump, i.e. an energy dissipater or quite simply a "bin", so that the intensity of the "raw beam" pre-regulated by the first control unit is regulated in accordance with the items of height information by simple changing of the energy.

This allows, for example, a silicone surface on an embossing roller or an auxiliary roller to be machined in an outstanding way by a laser beam that is generated by the resonator of a $CO_2$ gas laser. The control device usually also has for this purpose one or more sensors for determining the temperature of the laser resonator. The part of the laser beam that is reflected out downstream of the laser resonator in the first control device is approximately 1 to 2% here of the total energy of the laser beam.

Other features which are considered as characteristic for the invention are set forth in the appended claims.

Although the invention is illustrated and described herein as embodied in a method and apparatus for producing three-dimensionally structured surfaces, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
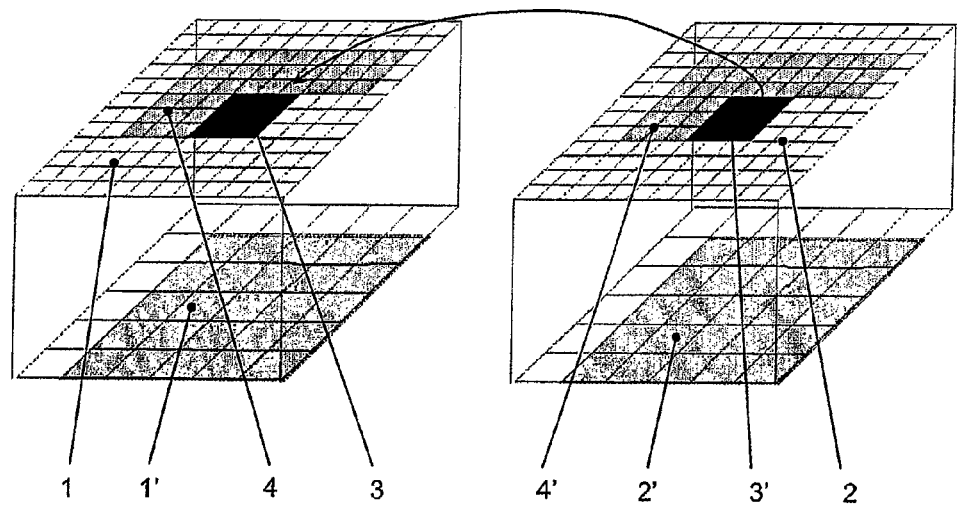
FIG. 1 is a three-dimensional view of a reproduction surface according to the invention.

Referring now to the figures of the drawing in detail and first, particularly, to FIG. 1 thereof, there is shown once again the essence of a neighborhood comparison for determining the height information of a reproduction surface 1. A first data record with the topology of a bounded original surface 2 is stored, the data record contains measured items of height information of the respectively associated area elements of the original surface.

After that, another, "second" data record is produced and stored, containing randomly generated items of height information for respectively associated area elements of an unbounded reproduction surface 1. The original surface is in this case—as already described—much smaller than the reproduction surface and also bounded. For easier understanding, however, these differences in size have not been included in the representation that is shown in FIG. 1, so that the surfaces 1 and 2 shown in FIG. 1 are actually, and for the sake of simplicity, only parts of the respective overall surfaces.

The next method step (c) relates in that, around a first item of height information of the reproduction surface, i.e. around an arbitrarily selected first area element 3 of the reproduction surface 1 occupied by an item of height information, a number of neighboring random items of height information belonging to a group of area elements 4 disposed in an L-shaped manner are grouped together to form a first subset and are stored in a third data record. The area element 3 here contains 9 (3×3) individual area parts (pixels); the group of area elements 4 disposed in an L-shaped manner contains a total of 36 individual area parts (pixels).

The position and arrangement of the neighboring items of height information of the area elements 4 are likewise stored, to be specific by the coordinates of the respectively associated area elements 4 of the reproduction surface 1. The third data record consequently contains data of the reproduction surface.

After that, the third data record is compared with a fourth data record. Stored as a second subset in the fourth data record are a group of neighboring measured items of height information of the original surface 2 belonging to a group of area elements 4' disposed in an L-shaped manner.

Likewise stored by the coordinates of the respectively associated area elements 4' are also the position and arrangement of the neighboring items of height information of the original surface 2. The fourth data record consequently contains data of the original surface.

This is followed by a comparison of the surroundings, the neighborhoods as such, i.e. the respectively neighboring items of height information of the groups of area elements 4 and 4'. At the same time, a comparison is performed with the neighboring items of height information 1' and 2' already stored in the previous run of method steps a) to f), if these are already available and if the "resolution pyramid" procedures have already been started, i.e. if a previous run with a coarser raster has already taken place.

With a defined similarity between the items of height information of the first and second subsets, that is to say the items of height information of the groups of area elements 4 and 4', the first random item of height information of the area element 3 of the reproduction surface, i.e. the height value for the first observed "point" of the reproduction surface, is then substituted by a second item of height information of the area element 3' of the original surface.

As a result, in this method step (e), a height value for a first "point" of the reproduction surface is therefore substituted by a height value of another, second "point" on the original surface. The criterion for the selection of the "substitute value" is in this case "matching" neighborhoods from the reproduction area and the original area, to be specific matching with regard to their items of height information and with respect to their position in relation to the first and second points in the reproduction surface and the original surface.

Figure 2:
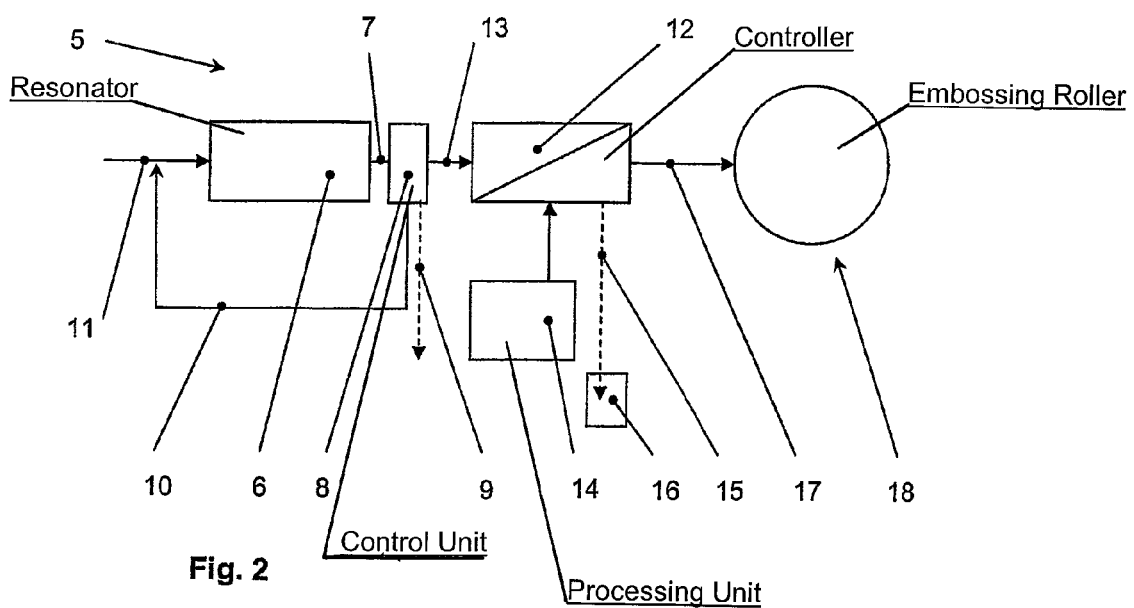
FIG. 2 is a block diagram of an apparatus for carrying out the method according to the invention.

FIG. 2 shows in the form of a first basic diagram the construction of an apparatus 5 for carrying out the method according to the invention.

The apparatus 5 has a $CO_2$ gas laser with an associated resonator 6, from which the laser beam 7 emerges. A first control unit 8 for regulating and keeping constant an intensity of the laser beam 7 is constructed in such a way that part 9 of the laser beam 7 is reflected out and an input power of the laser is controlled in dependence on the intensity/energy of the reflected-out part 9 of the laser beam. Directly acting feedback 10 for keeping an input power 11 of the laser beam constant is achieved as a result.

A downstream, second control unit 12 serves for modulating the intensity of the regulated laser beam 13 in dependence on the items of height information of the reproduction surface that are determined by a processing unit 14. The downstream, second control unit 12 reflects out part 15 of the regulated laser beam and only allows through the energy that is "needed" for the machining of the surface. The second control unit 12 for modulating the intensity of the regulated laser beam is formed as a grating that changes its transmissivity in dependence on oscillations.

The reflected-out part 15 of the laser beam is captured in the "beam dump" 16, where it is transformed into other forms of energy (heat) and dissipated. The modulated laser beam 17 is directed onto the polymer surface to be machined of an embossing roller 18, in this case onto a silicone surface.

The invention claimed is:

1. A method for producing three-dimensionally structured surfaces of objects, an object surface being produced with an aid of a machine tool as a reproduction of a three-dimensionally structured original surface being finite and bounded by borders, a topology of the original surface first being determined with an aid of a scanning method and topological data determined in this way and substantially containing heights belonging to each area element of the original surface being used for electronic control of the machine tool for machining a three-dimensionally structured object surface, which comprises the steps of:

a) storing a first data record with a topology of a bounded original surface, the first data record containing measured items of height information of respectively associated area elements of the bounded original surface;

b) subsequently storing a second data record, corresponding to a randomly generated topology of an unbounded reproduction surface, the second data record containing randomly generated items of height information for respectively associated area elements of the unbounded reproduction surface;

c) around a first random item of height information of the unbounded reproduction surface, grouping together a number of neighboring random items of height information to form a first subset and storing the first subset in a third data record, a position and configuration of the neighboring random items of height information likewise being stored by coordinates of the respectively associated area elements of the unbounded reproduction surface;

d) repeatedly comparing the third data record with a fourth data record, the fourth data record being occupied by new data with every new comparison by the further steps of:

1) storing a second subset of neighboring measured items of height information of the bounded original surface and also a position and configuration of the neighboring items of height information of the bounded original surface given by coordinates of the respectively associated area elements, in the fourth data record;

2) the position and configuration of the neighbouring items of height information of the first and second subsets being similar or identical;

e) on reaching a defined similarity between an item of height information of the first subset and the items of height information of the second subset, the first random item of height information of the bounded reproduction surface is substituted by a second item of height information of the bounded original surface, which corresponds in its position and configuration with respect to the second subset to the position and configuration of the first item of height information with respect to the first subset;

f) carrying out and repeating the method steps c) to e) with different first and second subsets and successively for all the items of height information of the unbounded reproduction surface as often as it takes until all items of height information of the unbounded reproduction surface have been successively substituted by items of height information from the bounded original surface, the items of height information that have already been substituted in the unbounded reproduction surface with an aid of at least one preceding method steps e) being included in the first subset for carrying out method step c) for the comparison of the subsets in method step d);

g) after all the items of height information of the unbounded reproduction surface have been substituted by items of height information of the bounded original surface in method step f), method steps a) to f) are run through at least one more further time, the area elements respectively associated with the items of height information being reduced with every further run, and a reaching of a defined similarity between a new first subset and the neighboring items of height information already stored in a previous run of method steps a) to f) being checked in method step e) as a simultaneous further criterion;

h) after reaching a defined similarity between the unbounded reproduction surface and the bounded original surface, the items of height information of the unbounded reproduction surface are made available for controlling the machine tool for machining the three-dimensionally structured object surface; and i) controlling the machine tool for machining the three dimensionally structured object surface using the items of height information made available in step h).

2. The method according to claim 1, which further comprises determining the topology of the bounded original surface with an aid of a digital scanning method.

3. The method according to claim 1, which further comprises forming the unbounded reproduction surface as a toroidal area.

4. The method according to claim 1, wherein the position and configuration of the neighboring items of height information of the unbounded reproduction surface and of the bounded original surface, determined by the coordinates of the respectively associated area elements, are formed as an L-shaped configuration of the neighboring items of height information.

5. The method according to claim 1, which further comprises performing the scanning of the topology of the bounded original surface with an aid of optical methods in which the scanning of the three-dimensionally structured original surface is performed with an aid of an interferometer.

6. The method according to claim 1, which further comprises performing a height measurement with a vertical resolution of from 2 to 100 nm.

7. The method according to claim 1, which further comprises performing the scanning of the topology of the bounded original surface with a lateral resolution of from 1 to 100 μm.

8. The method according to claim 1, which further comprises forming the three-dimensionally structured object surface inversely in relation to the bounded original surface.

9. The method according to claim 1, which further comprises:

transforming and storing the items of height information assigned to the respectively associated area elements into items of color information for individual area elements; and after carrying out method steps of a) to f), transforming the items of color information into corresponding items of height information and are made available for the control of the machine tool for machining the three-dimensionally structured object surface.

10. The method according to claim 9, which further comprises transforming and storing the items of height information assigned to the respectively associated area elements into the items of color information for the individual area elements being in a form of gray-scale values for the individual area elements.

11. The method according to claim 1, which further comprises compressing or extending coordinates of the items of height information of the unbounded reproduction surface used for control of the machine tool and the position and configuration of the respectively associated area elements in area regions in which an extension or compression of the bounded object surface is performed in a later machining or re-forming operation.

12. The method according to claim 1, which further comprises:

providing a laser as the machine tool; and reducing in half the items of height information with every further run.

13. The method according to claim 1, which further comprises forming the unbounded reproduction surface as a surface of an annular torus of a substantially circular cross section.

14. The method according to claim 1, which further comprises performing the scanning of the topology of the bounded original surface with an aid of a light measuring method in which the scanning of the three-dimensionally structured original surface is performed with an aid of an interferometer.

15. The method according to claim 1, which further comprises performing the scanning of the topology of the bounded original surface with a lateral resolution of from 5 to 40 μm.

* * * * *